(12) United States Patent
Hu et al.

(10) Patent No.: US 7,057,740 B2
(45) Date of Patent: Jun. 6, 2006

(54) SYSTEM AND METHOD FOR CALIBRATING A HARD DISC DRIVE MAGNETIC HEAD FLYING HEIGHT TESTER BY OPTICAL INTERFERENCE TECHNIQUES

(75) Inventors: Yuanzhan Hu, Dongguan (CN); Yu Li, Dongguan (CN); Hong Tian, Tai Po (HK)

(73) Assignee: SAE Magnetics (H.K.) Ltd., Shatin (HK)

( * ) Notice: Subject to any disclaimer, the term of this patent is extended or adjusted under 35 U.S.C. 154(b) by 372 days.

(21) Appl. No.: 10/620,630

(22) Filed: Jul. 15, 2003

(65) Prior Publication Data

US 2004/0141186 A1    Jul. 22, 2004

(30) Foreign Application Priority Data

Jan. 20, 2003    (CN)    .................... PCT/CN03/00047

(51) Int. Cl.
*G01B 11/02*    (2006.01)
*G01J 1/10*    (2006.01)

(52) U.S. Cl. .................................. 356/507; 356/243.3
(58) Field of Classification Search ............... 356/507, 356/243.3; 360/77.03
See application file for complete search history.

(56) References Cited

U.S. PATENT DOCUMENTS

| 4,624,564 A |   | 11/1986 | Dahlgren ..................... 356/243 |
| 5,280,340 A |   | 1/1994 | Lacey ......................... 356/357 |
| 5,410,402 A |   | 4/1995 | Li et al. ..................... 356/243 |
| 5,453,831 A | * | 9/1995 | Li et al. .................. 356/243.3 |
| 5,552,884 A |   | 9/1996 | Li et al. ..................... 356/243 |
| 5,710,632 A | * | 1/1998 | Li .............................. 356/507 |

* cited by examiner

*Primary Examiner*—Gregory J. Toatley, Jr.
*Assistant Examiner*—Michael A. Lyons
(74) *Attorney, Agent, or Firm*—Kenyon & Kenyon LLP

(57) ABSTRACT

A system and method are disclosed for calibrating a hard disc drive magnetic head flying height tester by a calibration standard, which includes a mock slider and mock disc, by optical interference techniques.

33 Claims, 7 Drawing Sheets

SYSTEM AND METHOD FOR CALIBRATING A HARD DISC DRIVE MAGNETIC HEAD FLYING HEIGHT TESTER BY OPTICAL INTERFERENCE TECHNIQUES

BACKGROUND INFORMATION

The present invention relates to optical gap measuring tool calibration. More specifically, the invention relates to a system and method for calibrating a hard disc drive magnetic head flying height tester by optical interference techniques.

FIG. 1 provides an illustration of a typical hard disc drive. In the art of hard disc drives, magnetic read/write heads 102 are commonly integrated in a slider 102 designed to respond to a flow of air moving with the rotating disc 104 over which the slider 102 travels. The head/slider 102 'flies' close to the surface of the disc 104. In manufacturing such heads/sliders 102, it is often necessary to test hydrodynamic characteristics of the heads 102 to verify their performance. It is important that the head 102 not travel too far from or close to the disc 104 surface. Further, it is important to prevent the head 102 from traveling at an improper angle with respect to the disc surface 104. A head 102 traveling too high above the disc surface 104 will result in a lower than desired areal density. A head 102 traveling too low can cause an interface failure between the head 102 and disc 104.

In order to test the flying height of the head, a flying height tester is commonly used. Optical interference techniques are often employed to determine the distance between head and disc. A monochromatic light source is directed at a transparent surrogate disc, such as a glass disc, rotating at speeds similar to that of a magnetic disc, and the head assembly being tested is secured in a holder in its normal flying orientation in relation to the disc. The monochromatic light is directed at the disc at a predetermined angle to the surface thereof. The light is reflected from the surface of the disc closest to the head, as well as from the surface of the flying head itself, and impinges onto a light sensitive sensor.

The interference effects created by the combined reflections from the disc and the slider surface provide the flying height information. A computer receives data from the flying height tester and calculates the perceived flying height and angle of the head. As hard drives become smaller and increase in data storage capacity, the desired head flying height continually reduces. Therefore, the accuracy of a flying height tester, and thus its calibration, are of critical concern.

FIG. 2 illustrates a typical device used to calibrate a flying height tester. A calibration standard, such as is depicted in U.S. Pat. No. 5,552,884, is often utilized. As can be seen in FIG. 2a, the calibration standard includes a mock head 48 in contact with a transparent disc 44 via a load spring 52. The transparent disc 44 has a plurality of grooves 60 formed in a surface facing the mock head 48. A cover case 56 is attached to the glass disc 44 at one end and provides a sealed environment for the interface between the mock head 48 assembly and the transparent disc 44. Several problems exist with the utilization of this device. For example, in establishing H1 204, which is important in evaluating flying height (explained below), the nature of the design causes problems with using optical interference means. Measurement of H1 205 must not be taken too close to a ridge's 64 edge, or else one (or both) of the measurement light beam's return paths 206,208 may travel a portion through air (separated by the walls at 120 and 124). The differences in optical properties between air and the transparent disc (glass, etc.) disrupts the travel path and thus causes inaccurate optical interference measurement results (i.e., the resultant beams 206 and 208 are not at the correct positions and/or the correct distance apart for accurate measurement). Therefore, H1 measurements may only be taken towards the center of the ridges 64 (if at all). This prevents appropriate compensation for surface irregularities 76 in the mock disc 48. Also, a separate device must be used to determine a minimum and maximum light intensity for the flying height tester, a necessary step in calibration, as explained below. This separate device adds cost and complexity to the calibration process.

It is therefore desirable to have a system and method for calibrating flying height testers that avoids the above-mentioned problems, as well as having additional benefits.

DETAILED DESCRIPTION

Figure 3:
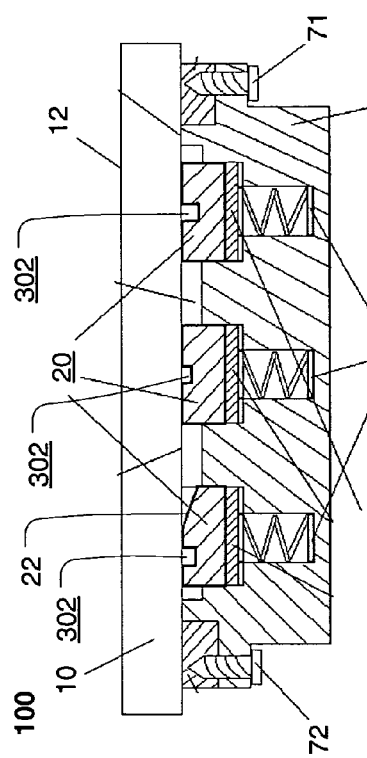
FIG. 3 illustrates a flying height tester calibration standard according to an embodiment of the present invention.
Figure 3:
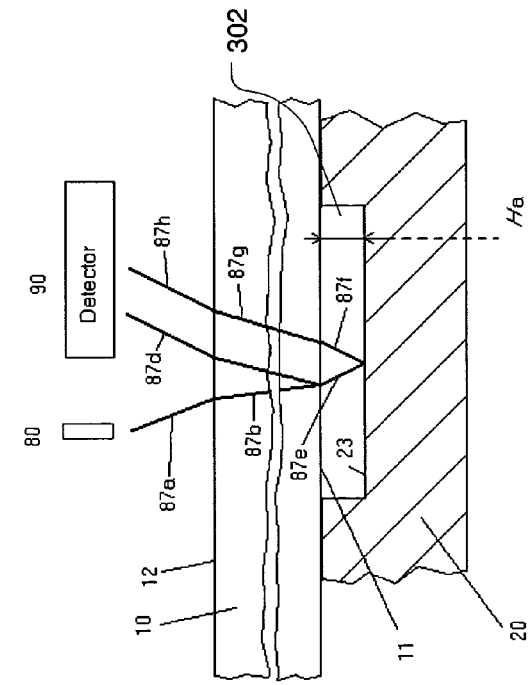
Figure 3:
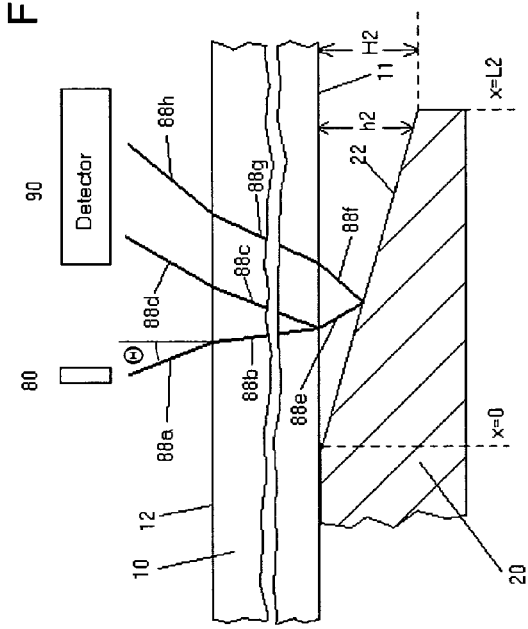

FIG. 3 illustrates a flying height tester calibration standard according to an embodiment of the present invention. As can be seen in FIG. 3a, in one embodiment, the calibration standard 100 includes a transparent mock disc 10 and one or more mock heads 20 placed in substantial contact with the mock disc 10 by one or more load springs 40. In this embodiment, a cover 50 is utilized to protect the standard from contaminants such as dust and debris. In this embodiment, two screws 71,72 are used to secure the cover 50 (and thus, the mock heads 20) to the mock disc 10. In this embodiment, the mock disc 10 is made of a substantially smooth, transparent material such as glass. Further, in this embodiment, the mock head 20 is provided an overcoat by thin film chemical deposition to emulate the optical properties of a head/slider.

In one embodiment, the height standard 100 plays two roles: a light intensity calibration tool and a height calibration tool. As a light intensity calibration tool, an inclined surface 22 on one or more of the mock heads 20 is utilized. As shown in FIG. 3b, in one embodiment, the light source 80 of the flying height tester is moved (with respect to the standard) along the inclined surface 22. As the tester is passed over the inclined surface 22, optical interference techniques (described below) yield an oscillating, continuous spectrum containing segments of high intensity light as well as darker segments. From this continuous spectrum, values for both maximum light intensity and minimum light intensity received at the detector 90 can be established. In this embodiment, the values of light intensity are stored in a computer (not shown) associated to the flying height tester.

After establishing the range of light intensity for the flying height tester, in an embodiment, the depth (flying height) of at least one surface recess 302 is measured with the flying height tester to determine at least one 'observed' distance between the disc 10 and surface 23 of recessed portion 302. In this embodiment, the physical dimensions of the mock head 20 may be determined by a device, such as an atomic force microscope (AFM), and thus, the 'actual' distance between the disc 10 and the surface 23 of the recessed portion 302 can be compared to the 'observed' distance for calibration of the flying height tester. The differential between 'actual' and 'observed' distance is used to adjust the flying height tester for calibration. In one embodiment, multiple recessed portions 302 of differing depths (heights) are provided to improve calibration (calibration for different heights). Also, because the dimensions of the inclined surface 22 are known, it can be used to perform gap calibration as well (i.e., depth being known at any position x).

As explained, in one embodiment of the present invention, to calibrate a flying height tester, the calibration standard 100 is placed in the flying height tester in place of the original glass disc (not shown) of the tester under the tester's light source 80. As shown in FIGS. 3b and 3c, in calibrating the flying height tester, height measurements are taken by the tester, yielding 'observed' distances. The 'observed' distances are compared with the 'actual' distances at those locations. In one embodiment, a linear translator and computer (not shown) are utilized to position the standard 100 appropriately for measurement. In this embodiment, at each measurement point, monochromatic light 88a is directed at the (transparent) mock disc 10 by the light source 80, as shown in FIG. 3b. The light 88a impinges the disc 10 at an angle incident θ to a first mock disc surface 12 and continues through the (glass) mock disc 10 along path 88b to a second mock disc surface 11, where it splits and is partially reflected. The reflected portion follows path 88c through the disc 10 to the first surface 12, and follows path 88d to a sensor 90 of the flying height tester (not shown). The remaining light follows path 88e to the mock slider (head) surface 22 where it is reflected to the mock disc 10 via path 88f. The light impinges the second surface 11 of the mock disc 10, follows path 88g through the disc 10 and follows path 88h to the tester sensor 90. The slight angular deviations between paths at the air/disc interface are due to the Snell effect. Both the height h2 and the incident angle θ have been exaggerated in FIG. 3b for illustrative purposes. Path 88a is actually substantially normal to the mock disc surface 12 with typical flying height testers.

Figure 4:
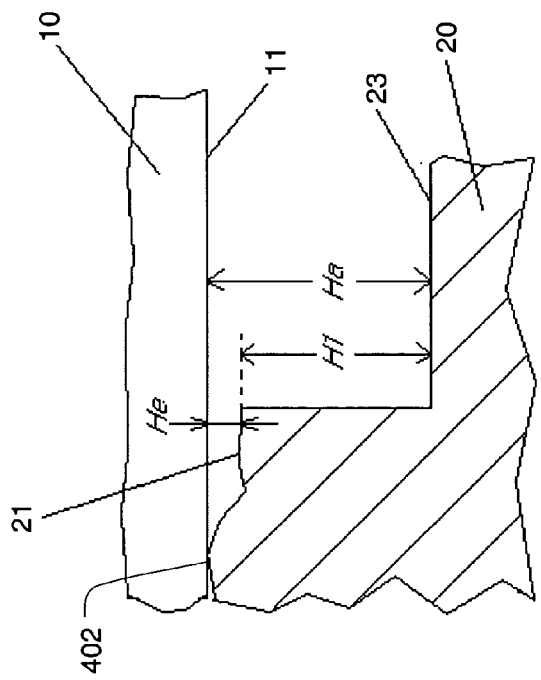
FIG. 4 illustrates surface irregularity compensation and provides further detailed illustrations of two mock heads according to an embodiment of the present invention.
Figure 4:
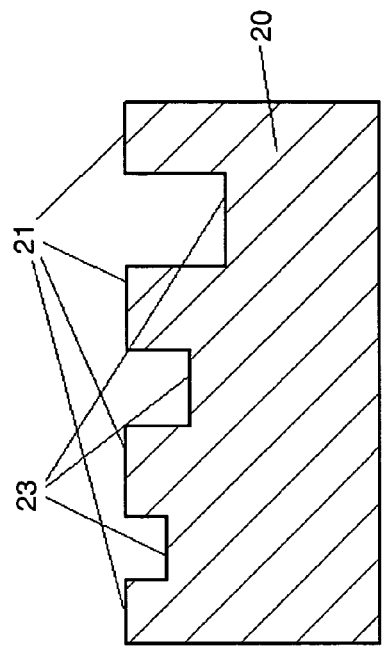
Figure 4:
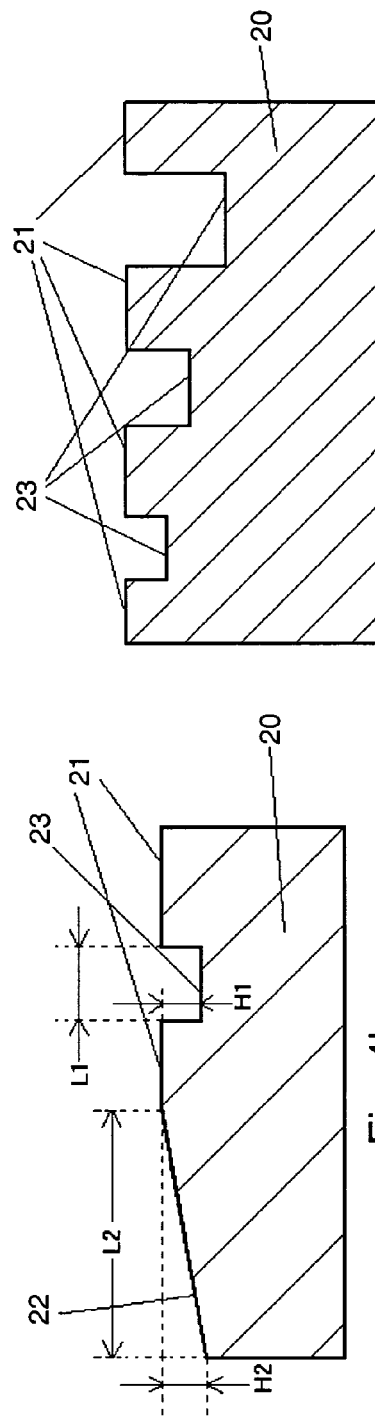

FIG. 4 illustrates surface irregularity compensation and provides further detailed illustrations of two mock heads according to an embodiment of the present invention. As seen in FIG. 4a, because of surface irregularities upon the top of each mock head 20, the distance, He, from disc to mock head surface 21 varies with position. In one embodiment of the present invention, the mock head's surface profile may be determined by a device such as a profilometer. This surface profile, combined with the knowledge of the 'actual' dimensions of the mock head 20 (by AFM, etc.) enable improved calibration. The true depth Ha of the recessed portion of the mock head 20 is slightly different than the apparent depth H1 (because of high points 402 on the mock head 20 surface). Utilizing Ha as the 'actual' distance provides a more accurate value. In an embodiment, the acquired surface irregularity information may be used by the flying height tester computer to provide a correction factor or a series of correction factors for the calibration.

FIGS. 4b and 4c further illustrate a mock head slider 20 with a recessed surface 23 and inclined surface 22 (see FIG. 4b) and a mock head slider 20 with a series of recessed surfaces (grooves) 23 at varying depths (see FIG. 4c) under an embodiment of the present invention. In one embodiment, recessed surface 23 length L1 is greater than 50 microns, and the recessed surface 23 depth (flying height) H1 is greater than 2 nanometers. In one embodiment, inclined surface height (rise) H2 is between 12 and 13 microinches (0.31–0.33 microns), and inclined surface 22 length (run) L2 approaches 100 mils (2,540 microns). As stated above, the mock heads 20 can be used together in a calibration standard 100 (see FIG. 3a), or they can be used alone in a calibration standard 100.

Figure 5:
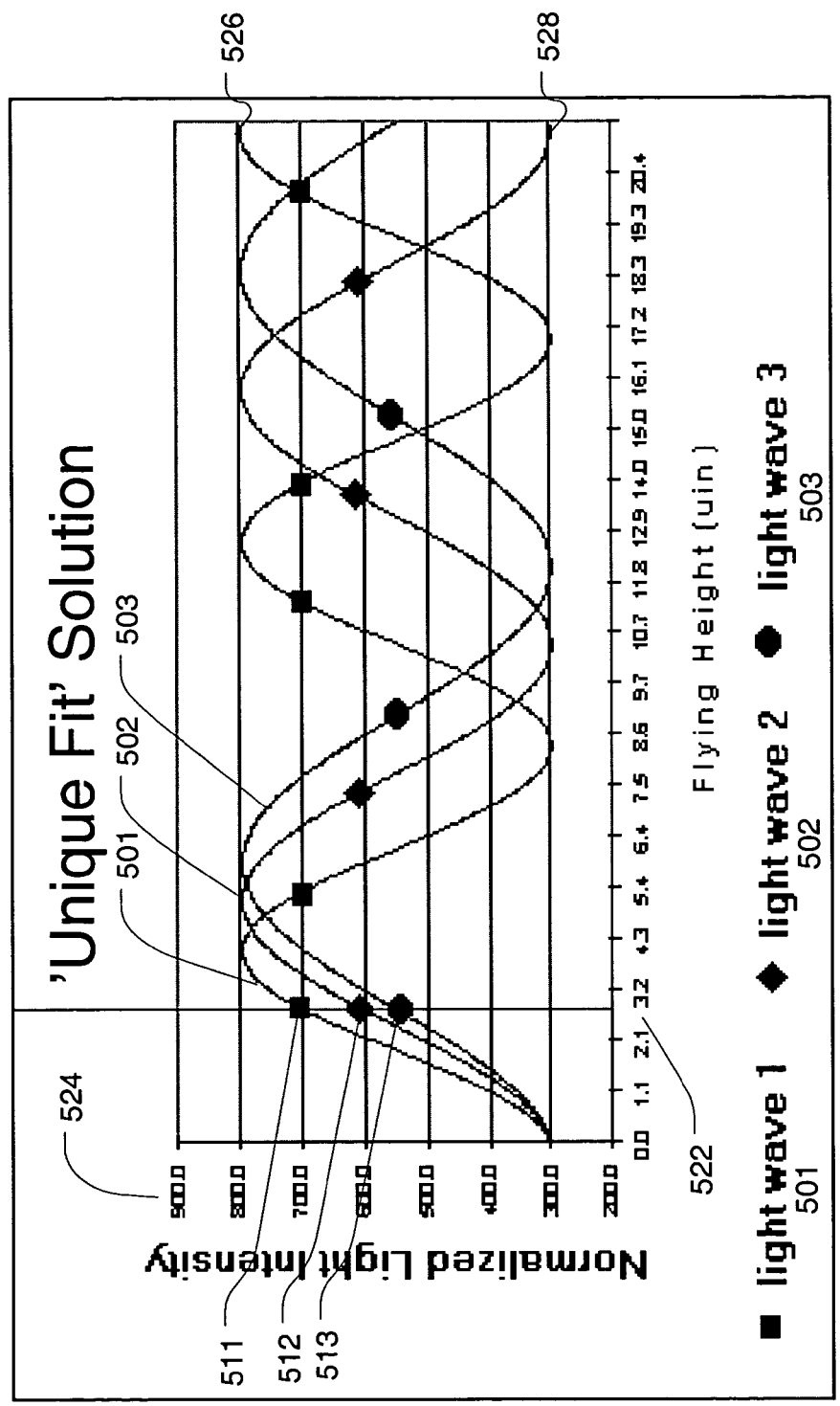
FIG. 5 provides a graphical illustration of the 'unique fit' solution utilized for providing a continuous spectrum of uniquely-valued combinations associatable to a range of head/disc gaps under principles of an embodiment of the present invention.

FIG. 5 provides a graphical illustration of the 'unique fit' solution utilized for providing a continuous spectrum of uniquely-valued combinations associatable to a range of head/disc gaps under principles of an embodiment of the present invention. In one embodiment, light of multiple wavelengths (e.g., three wavelengths 501,502,503) is directed at the surface to be measured. In one embodiment, upon varying the distance between the mock head and mock disc to obtain the maximum and minimum light intensity (for light intensity calibration), multiple curves may be developed. After calibrating light intensity at the different wavelengths (equalizing amplitude), the wavelengths displayed superimposed provide multiple curves that may be utilized for a 'unique fit' solution spectrum. By optical interference, light intensity 524 received by the detector oscillates repeatedly between the maximum 526 and the minimum 528 as the distance measured increases (or decreases). Although each curve passes through the same light intensity values multiple times as the measured distance increases (or decreases) through the range of possible values, the combination of values 511,512,513 provided by the multiple-wavelength light source is unique for each distance in the range of possible distances 522. This 'unique fit' solution provides a range of light intensity combinations that is directly and uniquely associatable to the range of possible distances to be measured.

According to embodiments of the present invention, a calibration device is provided for both light intensity/unique fit theory curves (inclined surface; See, e.g., FIG. 4b) and for specific depth (flying height) measurement calibration (recessed surface; See, e.g., FIG. 4c). In this embodiment, both mock heads are provided in the same calibration standard (as opposed to requiring a separate standard/device). As stated previously, typical calibration standards in the art provide no more than a series of grooves for gap calibration (on the disc side, not on the head side). For light intensity calibration and the development of theory curves, a separate component (a wedge piece) would need to be added, adding cost to the manufacture and operation. Therefore, in addition to the advantages of having varying-depth grooves on the mock head (as opposed to on the mock disc; as explained above), having all parts integrated in a single calibration standard is advantageous from both a complexity and a cost standpoint. Further, the process of forming grooves (by, e.g., ion milling or chemical etching) in a mock disk of glass, for example, is more difficult because of its hardness than forming similar grooves in a mock head (substrate). Further, etching glass with such methods produces surface roughness (irregularities) as large as 0.4 microinches (~10 nanometers) or more, exacerbating calibration difficulties.

Figure 1:
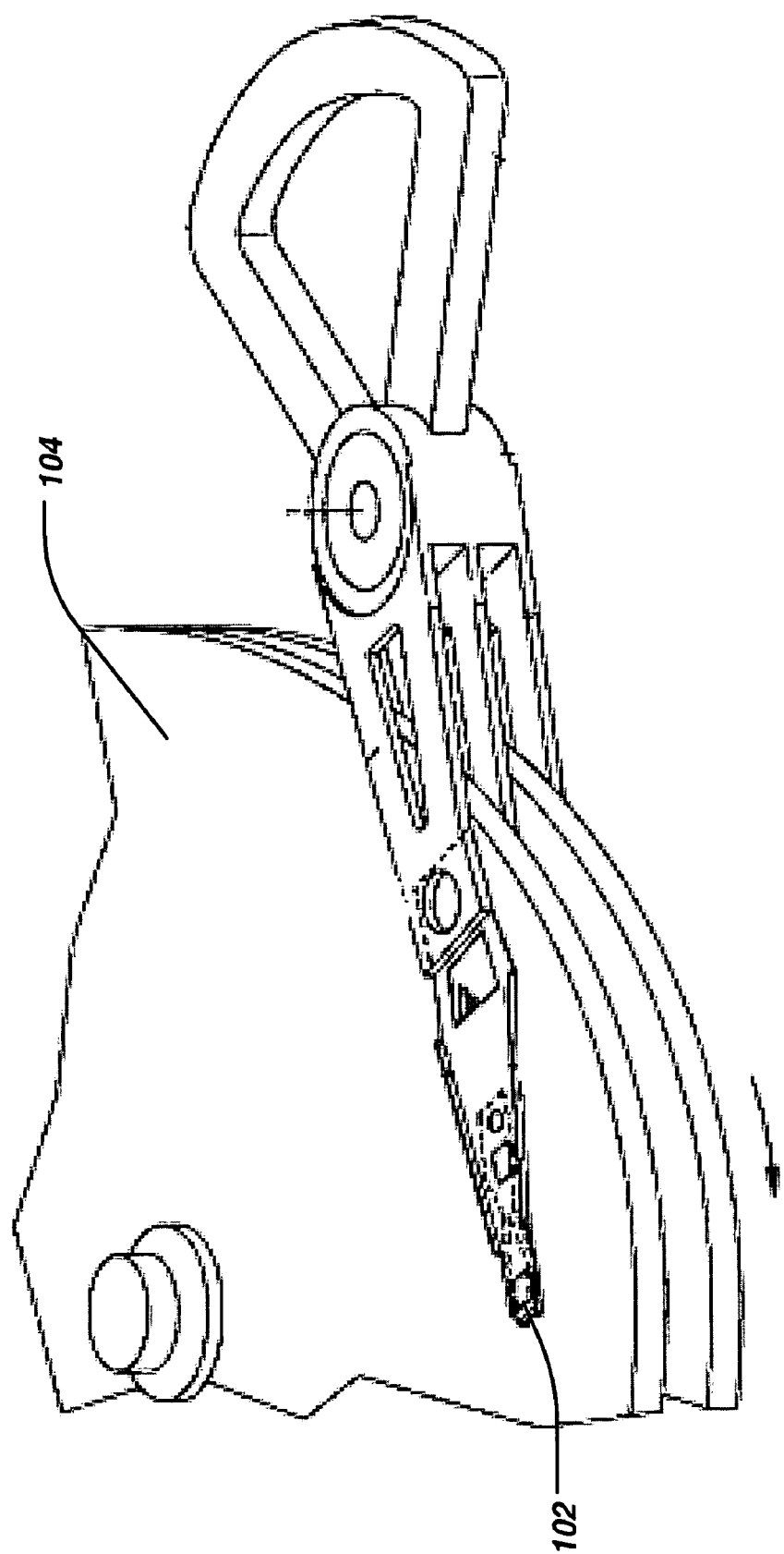
FIG. 1 provides an illustration of a typical hard disc drive.
Figure 2:
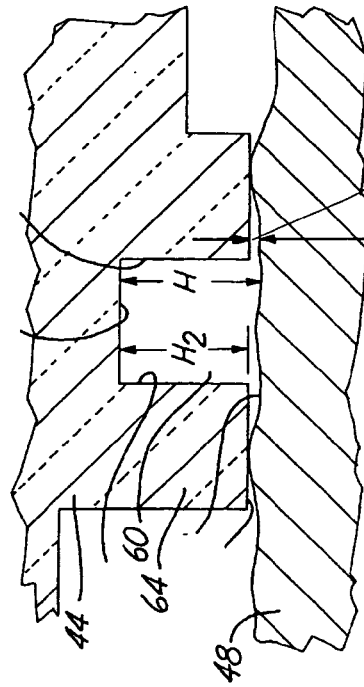
FIG. 2 illustrates a typical device used to calibrate a flying height tester.
Figure 2:
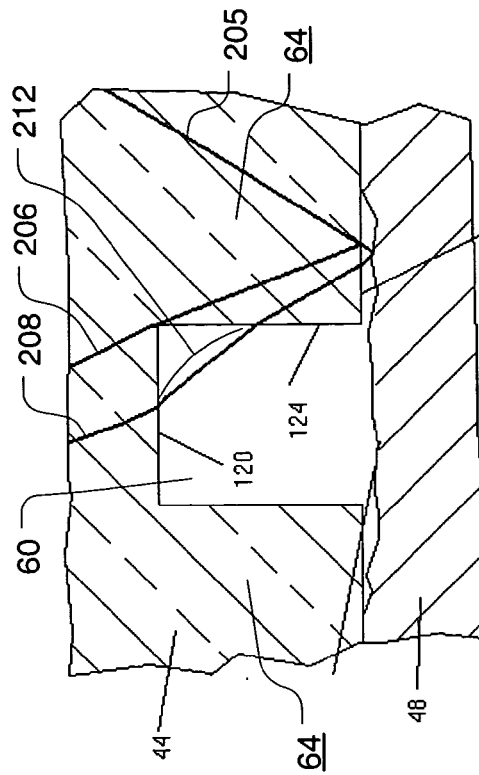
Figure 2:
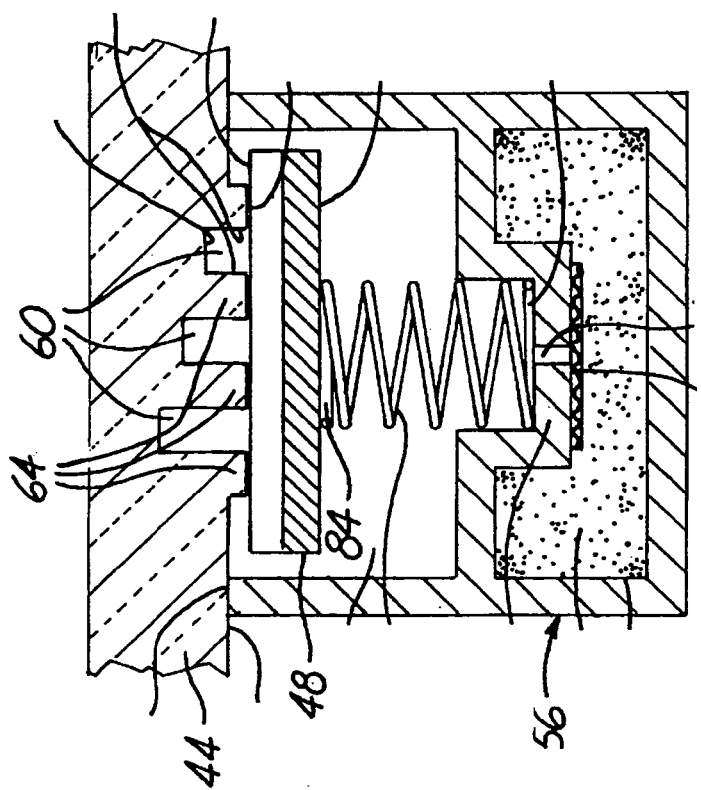

Further, employing optical interference techniques with calibration grooves 60 formed in the mock disc 44, such as in the prior art (see FIG. 2*a*), causes significant inaccuracies. If a measurement location is too close to the edge of a ridge 64, one or more of the light beam's return paths may pass through the air 212 (glass-air-glass, rather than just glass), altering the path of the light (see FIG. 2*c*). Because the distance in which one of the light beam travels through air defines the height measurement perceived, the light should travel through consistent paths through the glass (i.e., uniform thickness mock disc, such as the present invention).

Figure 6:
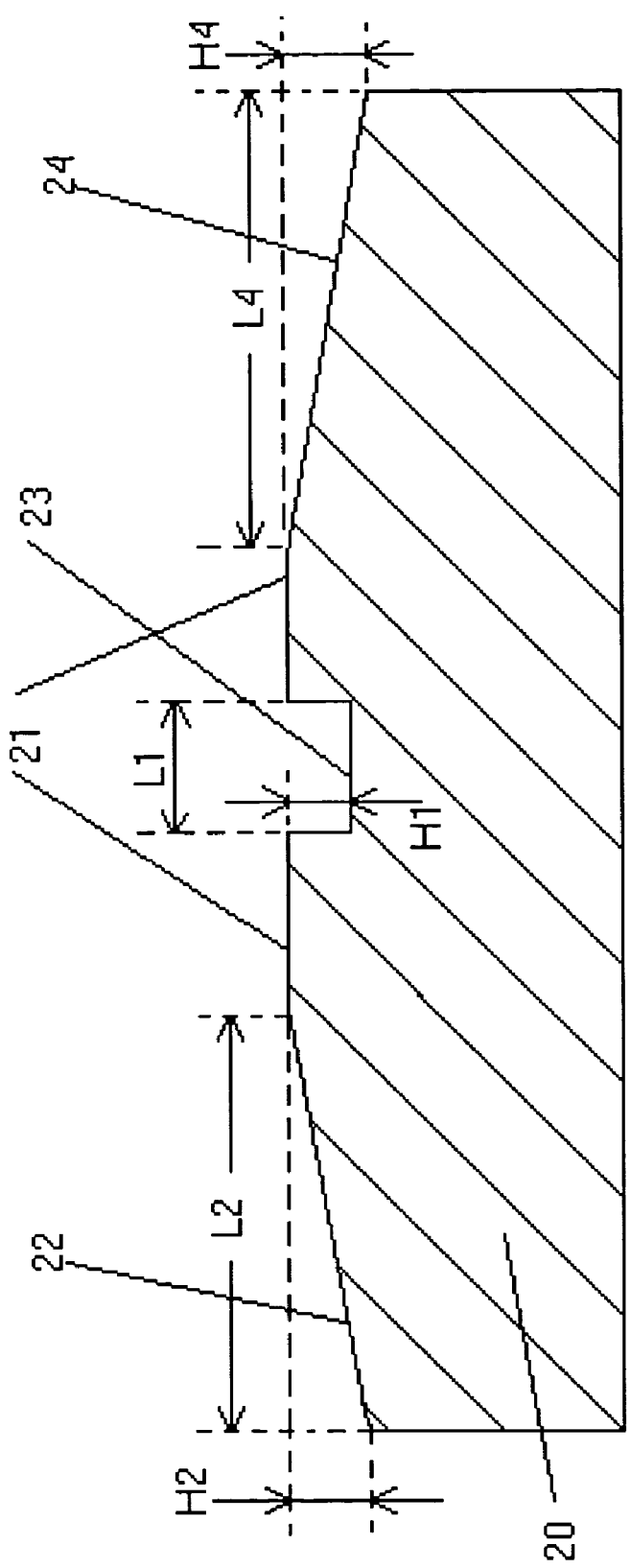
FIG. 6 provides an illustration of a mock head design according to an alternative embodiment of the present invention.

FIG. 6 provides an illustration of a mock head design according to an alternative embodiment of the present invention. In this embodiment, the mock head 20 has two separate inclined surfaces 22,24. In this embodiment they can be formed with differing slopes (H2/L2 and H4/L4). An inclined surface 22,24 with a shallow slope could be used for fine adjustment calibration and an inclined surface 22,24 with a steeper slope could be used for large range adjustment.

Figure 7:
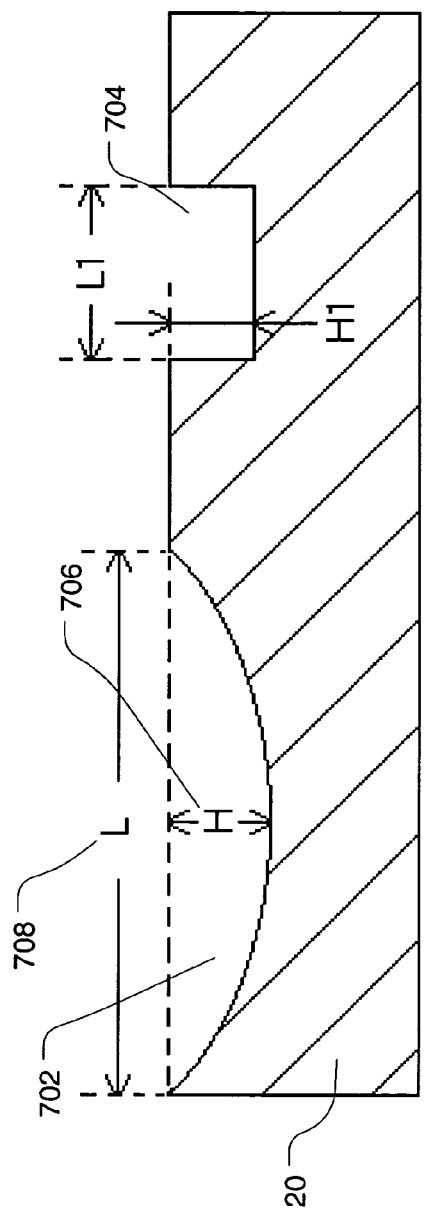
FIG. 7 provides illustrations of three mock head designs according to alternative embodiments of the present invention.
Figure 7:
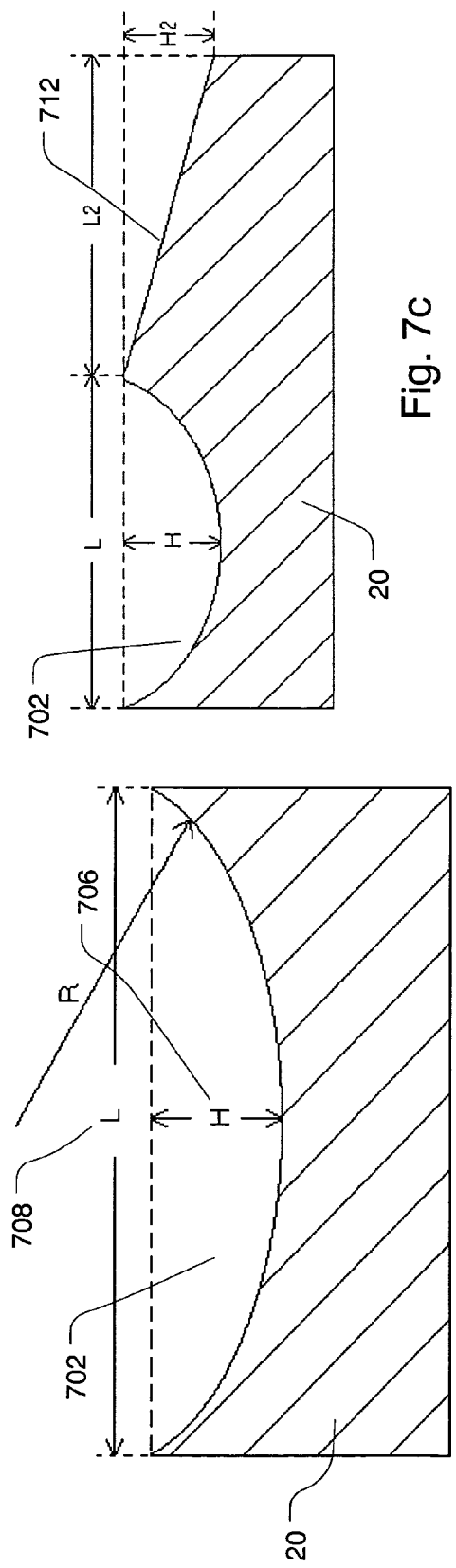
Figure 7:

FIG. 7 provides illustrations of three mock head designs according to alternative embodiments of the present invention. As shown in FIG. 7*a*, in one embodiment, the mock head 20 has a cylindrically convex (curved) portion 702 and a recessed surface portion 704. In this embodiment, the cylindrical portion 702 is used for light intensity calibration and gap spectrum calibration (via light intensity curves, as explained above). In this embodiment, the dimensions of the cylindrical portion 702 may be determined by AFM and known geometric principles to yield 'actual' (flying height) distances H 706 (similar to inclined surface 22; see FIG. 3*b*). Similar to above, in this embodiment, the recessed portion 704 is utilized for specific flying height calibration. As illustrated in FIG. 7*b*, in another embodiment, a mock head 20 with a cylindrical portion 702 is utilized in the calibration standard. In this embodiment, the cylindrical portion 702 is used for light intensity calibration, gap spectrum calibration (via light intensity curves), and specific flying height calibration. In this embodiment, specific gap measurement calibration (via 'actual' vs. 'measured' differential) is taken at a desired location. As stated the 'actual' distance is known by a device such as an AFM. In another embodiment, the curved surface 702 of the designs shown in FIGS. 7*a* and 7*b* is a spherical (convex) surface. In an alternative embodiment, as shown in FIG. 7*c*, a curved surface 762 (e.g., spherical, cylindrical, etc.) occupies the top portion of a mock head 20 with an inclined surface portion, providing further flexibility of calibration.

Although several embodiments are specifically illustrated and described herein, it will be appreciated that modifications and variations of the present invention are covered by the above teachings and within the purview of the appended claims without departing from the spirit and intended scope of the invention.

The invention claimed is:

1. A method for calibrating a gap measuring tool comprising:
   providing a calibration standard including at least one mock slider to be in contact with a mock disc, said mock slider including a recessed portion, said recessed portion being a slider surface recessed with respect to a disc surface;
   determining an actual distance between said disc and a surface of the recessed portion of said slider at at least one location;
   determining by optical measurement an observed distance between said disc and surface of recessed portion of said slider at said at least one of said locations; and
   comparing said observed distance to said actual distance at each of said location.

2. The method of claim 1, further comprising calibrating said gap measuring tool based on the differential between each measured distance and its associated actual distance.

3. The method of claim 1, further comprising:
   determining a surface profile; and
   compensating for surface irregularities based on said profile.

4. The method of claim 3, wherein said determining a surface profile is by a profilometer.

5. The method of claim 1, further comprising providing a mock slider having an inclined surface, said inclined surface maintaining a space between said disc and maid slider varying with respect to position.

6. The method of claim 5, further comprising forming said recessed portion of said slider by a chemical deposition process.

7. The method of claim 5, wherein said determining said actual distance is performed by an atomic force microscope (AFM).

8. The method of claim 5, wherein said calibration standard is shielded from contamination by a cover.

9. The method of claim 5, wherein contact is maintained between said mock slider and said mock disc by at least one spring.

10. The method of claim 5, wherein said gap varies with location.

11. The method of claim 10, wherein said gap varies in a manner selected from the group consisting of: linearly, parabolically, curvingly, and concavely.

12. The method of claim 5, wherein said optical measurement includes an optical interference measurement.

13. The method of claim 12, further comprising:
   determining an actual gap size between said disc and said inclined surface at one or more locations;
   determining by optical measurement an observed gap size between said disc and said inclined surface at one or more of said locations; and
   comparing said observed gap size to said actual gap size at each of said locations.

14. The method of claim 13, further comprising:
   developing a plurality of curves representative of light intensity with respect to location on said inclined surface, each curve associated to a specific light frequency; and
   for each of a plurality of locations, associating a combination of light intensity values to their respective measured gap size.

15. The method of claim 13, further comprising:
   for each location, comparing the measured gap size to the actual gap size; and
   calibrating said gap size measuring tool based on the differential between each measured gap size and its associated actual gap site.

16. The method of claim 14, further comprising:
   utilizing the light intensity curves to determine a minimum light intensity and a maximum light intensity.

17. The method of claim 16, further comprising:
   calibrating said gap size measuring tool based on said minimum light intensity and said maximum light intensity.

18. A system for calibrating a gap measuring tool comprising:

a calibration standard including at least one mock slider to be in contact with a mock disc, said slider including a recessed portion, said recessed portion being a slider surface recessed with respect to a disc surface, wherein an actual distance between said disc and said surface of recessed portion of said slider is determined at at least one location;

an observed distance between said disc and said surface of recessed portion of said slider is determined by optical measurement at said at least one of said locations; and said observed distance is compared to said actual distance at each of said locations.

19. The system of claim 18, wherein said gap measuring tool is calibrated based on the differential between each measured distance and its associated actual distance.

20. The system of claim 18, wherein an irregularity gap between said disc and a top surface of said slider is determined by optical measurement at one or more locations.

21. The system of claim 18, wherein said mock slider has an inclined surface, said inclined surface maintaining a space between said disc and said slider varying with respect to position.

22. The system of claim 21, wherein said recessed portion of said slider is formed by a chemical deposition process.

23. The system of claim 21, wherein said actual distance is determined by an atomic force microscope (AFM).

24. The system of claim 21, wherein said calibration standard is shielded from contamination by a cover.

25. The system of claim 21, wherein contact is maintained between said mock slider and said mock disc by at least one spring.

26. The system of claim 21, wherein said gap varies with location.

27. The system of claim 26, wherein said gap varies in a manner selected from the group consisting of: linearly, parabolically, curvingly, and concavely.

28. The system of claim 21, wherein said optical measurement includes an optical interference measurement.

29. The system of claim 28, wherein an actual gap size between said disc and said inclined surface is determined at one or more locations; an observed gap size between said disc and said inclined surface is determined by optical measurement at one or more of said locations; and said observed gap size is compared to said actual gap size at each of said locations.

30. The system of claim 29, wherein a plurality of curves representative of light intensity with respect to location on said inclined surface are developed, each curve associated to a specific light frequency; and for each of a plurality of locations, a combination of light intensity values is associated to the respective measured gap size.

31. The system of claim 29, wherein for each location, the measured gap size is compared to the actual gap size; and the gap size measuring tool is calibrated based on the differential between each measured gap size and its associated actual gap size.

32. A method for calibrating a gap measuring tool comprising:

providing a calibration standard including at least one mock slider to be in contact with a mock disc, said slider having an inclined surface, said inclined surface maintaining a gap varying with position between said disc and said slider;

determining an actual gap size between said disc and said inclined surface at at least one location;

determining by optical measurement an observed gap size between said disc and said inclined surface at said at least one of said locations;

developing a plurality of curves representative of light intensity with respect to location on said inclined surface, each curve associated to a specific light frequency; and for each of a plurality of locations, associating a combination of light intensity values to their respective measured gap size.

33. The method of claim 32, further comprising;

for each location, comparing the measured gap size to the actual gap size; and calibrating said gap size measuring tool based on the differential between each measured gap size and its associated actual gap size.

* * * * *

UNITED STATES PATENT AND TRADEMARK OFFICE
CERTIFICATE OF CORRECTION

PATENT NO. : 7,057,740 B2  Page 1 of 1
APPLICATION NO. : 10/620630
DATED : June 6, 2006
INVENTOR(S) : Yuanzhan Hu et al.

It is certified that error appears in the above-identified patent and that said Letters Patent is hereby corrected as shown below:

Column 8, line 20: "slider" should be --mock slider--

Signed and Sealed this

Twenty-first Day of November, 2006

JON W. DUDAS
*Director of the United States Patent and Trademark Office*